MYERS & WELLMAN.
Cotton-Planter.
No 46,130. Patented Jan 31. 1865
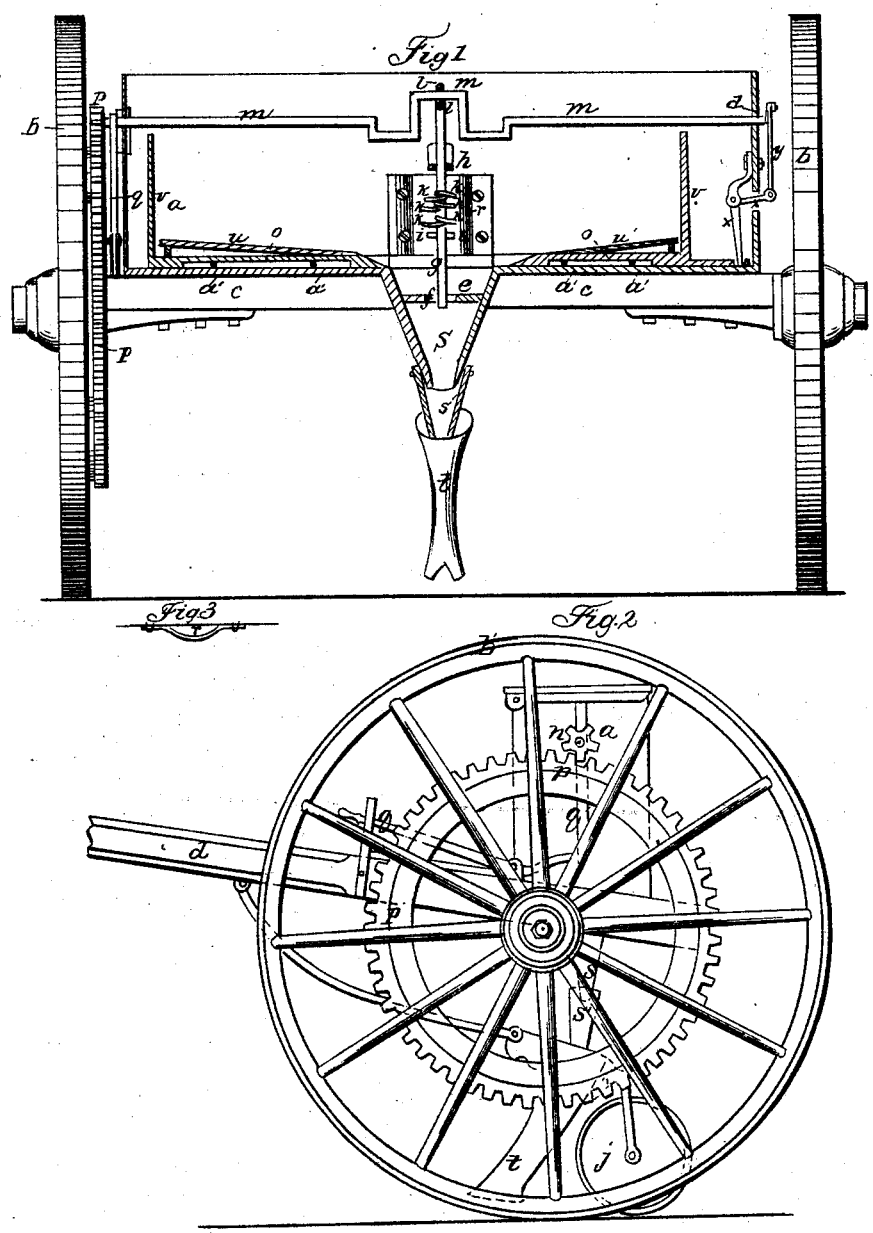
Witnesses
John M Neal
W. Bakewell
Inventors
Isaac Myers
Marshal D Wellman

UNITED STATES PATENT OFFICE.

ISAAC MYERS AND MARSHAL D. WELLMAN, OF PITTSBURG, PA.

COTTON-SEED PLANTER.

Specification forming part of Letters Patent No. 46,130, dated January 31, 1865; antedated January 19, 1865.

*To all whom it may concern:*

Be it known that we, ISAAC MYERS and MARSHAL D. WELLMAN, of the city of Pittsburg, in the county of Allegheny and State of Pennsylvania, have invented a new and useful Improvement in Cotton-Seed Planters; and we do hereby declare the following to be a full, clear, and exact description thereof, reference being had to the annexed drawings, forming part of this specification, in which—

Figure 1 is a rear or end view of our improved cotton-seed planter, the seed-box and hopper being shown in section. Fig. 2 is a side view of our improved machine. Fig. 3 is a top view of one of the projecting strips placed in the seed-box on each side of the hopper.

In the several figures like letters of reference denote similar parts of our cotton-seed planter.

In the operation of machines for planting cotton-seed two practical difficulties occur, which are attributable to the peculiar character of the seed. Cotton-seed is surrounded with particles of cotton, which cause the seeds to adhere to each other so closely that it is very difficult in planting them by machinery to separate from the mass the proper quantity of seed for each deposit. They are also apt to mat together in a hard lump and clog the machine, so as to prevent its operating. Our object is to remove these difficulties and produce a machine which will work easily without clogging and feed only two or three seeds at a time at regular intervals.

To enable others skilled in the art to construct and use our improved machine for planting cotton, we will proceed to describe its construction and operation.

In the drawings, $a$ is the seed-box, which is long and narrow with parallel sides. This seed-box is attached to a suitable carriage composed of a pair of wheels, $b\ b'$, axle $c$, and shafts $d\ d$, the seed-box being placed across the carriage between the wheels on or near to the axle $c$.

In the center of the bottom of the seed-box is a hopper-shaped depression, $e$, the bottom of which is a few inches below the bottom of the seed-box, and is smaller than the opening, as the sides are inclined.

Below or surrounding the hopper-box $e$ is a funnel, $s$, which may be a mere continuation of the hopper-box $e$, as shown in the drawings, and the lower part of which, $s'$, is pivoted to it, so as to allow of motion in the shoe $t$, through which the seeds are dropped and deposited in the ground.

In the bottom of the hopper-box $e$ is a small long and narrow opening, $f$, through which the seeds are fed from the hopper-box.

The feeding-rod $g$ is a straight iron rod, placed perpendicularly in the seed-box $a$ and passing through the bottom of the hopper-box $e$, and as the feed-rod is wider than the slit $f$ it passes through a hole made through the bottom of the hopper-box, which hole is intersected by the slit or opening $f$. This hole and the guide $h$ (which is a strip placed across the feed-box above the reach of the wires $k\ k$) serve to keep the feed-rod $g$ in a perpendicular position as it works up and down through the hopper-box $e$. A short piece of iron is passed horizontally through the feed-rod $g$ parallel to the sides of the feed-box, and of such length and width that it will pass through the slit $f$ in the bottom of the hopper-box $e$, and at such a height from the end of the rod $g$ as that when the rod $e$ is depressed the fingers $i\ i$, formed by the piece of iron just described, will pass below the bottom of the hopper-box $e$ into the funnel $s$, thus carrying with it so much cotton-seed as will pass through the slit $f$.

On the feed-rod $g$, and above the fingers $i\ i$, are pieces of bent wire $k\ k$, which are placed at intervals on the rod but loosely inserted therein. They are also longer than the fingers $i\ i$, not being designed to pass through the slit $f$ in the bottom of the hopper-box $e$.

At top of the feed-rod is a horizontal loop, $l$, through which passes the crank $m'$ of the shaft $m$, so that by the revolution of the shaft $m$ on its axis a vertical up-and-down motion of the feed-rod $g$ is given. The shaft $m$ passes horizontally through the seed-box $a$ and terminates at one end in a pinion, $n$, which gears into the teeth of a cog-wheel, $p$, attached to the inside of one of the carriage-wheels $b'$, so that by the revolution of the wheel $b'$ as the machine is drawn along the ground, a rapid up-and-down motion is communicated to the feed-rod. The number of revolutions of the shaft $m$ for each revolution of the wheels $b\ b'$ is regulated by the relative size of the cog-wheel $p$ and pinion $n$, which determines the distance apart at which the seed is delivered from the machine by the feed-rod $g$ and planted in the ground. This distance may be changed at pleasure by changing the pinion $n$, the distance of the center of which from the center of the cog-wheel $p$ may be adjusted by the levers $q$, the purpose of which is to raise up the end of the shaft $m$ so as to throw the pinion $n$ out of gear with the cog-wheel $p$ when the machine is to be moved along without working the seeding apparatus.

On either side of the hopper-box $e$, and attached to the side pieces or the seed-box $a$, are curved projections $r$, made of wood, leather, sheet-iron, or other suitable material, the curve of which projects slightly over the edge of the hopper-box $e$, so as to prevent the clogging of the hopper with a matted mass of cotton-seeds by the action of the sliding inclined planes, hereinafter described.

The shoe $t$, which is hung to the machine below the funnel $s'$, makes the furrow in which the seeds are deposited, and the roller-wheel $j$, placed behind it, covers them up.

Inside of the seed-box $a$ is placed a sliding frame consisting of a bottom piece, $o$, and two upright pieces, $v$ $v$, one at one end and the other near to the other end of the bottom piece. The bottom piece is of such width as to move freely inside the seed-box, and is a little shorter, so as to allow of a horizontal intermittent motion for the purpose of shaking the cotton-seed gradually into the hopper-box. The bottom piece, $o$, rests on rollers $a'$, placed in the bottom of the seed-box $a$. In the center of the sliding frame is a rectangular aperture of the width of the mouth of the hopper-box $e$, but of rather greater length, so that the mouth of the hopper-box $e$ may not be even partially covered by the edges of the sliding frame as it is moved back and forth in the seed-box $a$. From each end of the aperture in the sliding frame an inclined board, $u$ $u'$, extends nearly to the upright piece $v$ $v$ on either side, forming an inclined plane on each side of the hopper-box $e$. The boards $u$ $u'$ may be hinged to the bottom piece, $o$, of the sliding frame, so that the degree of inclination may be regulated to suit the requirements of the cotton-seed.

The reciprocating motion of the sliding bottom $o$ is communicated by means of the bent lever $x$, the lower extremity of which is inserted in a hole near one end of the bottom piece, $o$, of the sliding frame, and the upper extremity of the lever is connected by a link, $y$, to a short crank, $z$, at the extremity of the shaft $m$ opposite to that at which the pinion $n$ is placed. Thus every revolution of the shaft $m$ causes a rapid backward and forward motion of the sliding frame and inclined planes within the seed-box. When the sliding frame is pushed in one direction one of the edges of the aperture in its bottom piece coincides with the mouth of the hopper-box $e$, while the other edge is a few inches distant from the edge of the hopper-box, and on the return motion of the sliding frame the other edge of the aperture is brought to coincide with the edge of the hopper-box $e$.

The operation of our cotton-seed planter just described is as follows: The cotton-seed is placed in the seed-box $a$ and the hopper $e$ is kept continually supplied by means of the inclined planes $u$ $u'$ in the sliding frame, the cotton being shaken toward the hopper-box $e$ by the motion of the sliding frame. This is necessary, as the seeds hang together so closely that when the hopper-box $e$ is emptied of seed it would not be supplied from the box without some such device; but this forcing of the seed toward the hopper-box $e$ would tend to clog it were it not that the curved projections $r$ $r$ on either side of the hopper-box check it sufficiently to prevent the seed choking the hopper-box. The bent wires $k$ $k$ also serve by their motion up and down in the hopper-box $e$ to loosen the seeds and keep the cotton from matting together. The slit $f$ in the bottom of the hopper-box is just large enough to admit of the passage of two or three cotton-seed at a time, and then only when they are forced through it by the fingers $i$ $i$, and thus the intermittent motion of these fingers $i$ $i$ through the slit $f$ serves to deliver a few seeds only at a time through the slit $f$ into the funnel $s$ and shoe $t$, and that at regular intervals.

Having thus described our improvement in cotton-seed planters, what we claim as our invention, and desire to secure by Letters Patent, is—

1. The use of a feeding-rod having a finger or fingers which vibrate up and down through a suitable orifice in the bottom of the seed-box, so as to feed a few seeds only at a time, and that at regular intervals, substantially as described.

2. In combination with the feed-rod and fingers, wires so placed on that part of the rod which passes through the cotton in the feed-box for the purpose of loosening the mass of cotton-seeds and separating them from each other, substantially as described.

3. The use of the sliding frame with or without the inclined planes, and operated substantially as described, for the purpose of supplying the cotton-seed in the hopper-box.

4. The use of the curved projections $r$ $r$ on either side of the hopper-box to prevent the cotton being fed too fast into the hopper-box and clogging therein, substantially as described.

In testimony whereof the said ISAAC MYERS and MARSHAL D. WELLMAN have hereunto set their hands.

ISAAC MYERS.
   MARSHAL D. WELLMAN.

Witneses:
 JOHN M. NEAL,
 J. D. HANCOCK.